United States Patent [19]

Morita

[11] Patent Number: 5,930,467
[45] Date of Patent: Jul. 27, 1999

[54] INFORMATION PROCESSING APPARATUS HAVING A REDUCED ACCESS TIME TO STORAGE DEVICES

[75] Inventor: Takashi Morita, Yokohama, Japan

[73] Assignee: Ricoh Company, Ltd., Tokyo, Japan

[21] Appl. No.: 08/770,730

[22] Filed: Dec. 19, 1996

[30] Foreign Application Priority Data

| Dec. 22, 1995 | [JP] | Japan | 7-350331 |
| Feb. 15, 1996 | [JP] | Japan | 8-052251 |
| Aug. 23, 1996 | [JP] | Japan | 8-241450 |

[51] Int. Cl.$^6$ ................... G06F 13/00
[52] U.S. Cl. ............ 395/115; 395/116; 711/100; 358/444
[58] Field of Search ................ 395/115, 116, 395/112; 358/444; 711/100; 345/521

[56] References Cited

U.S. PATENT DOCUMENTS

| 4,442,488 | 4/1984 | Hall | 711/100 |
| 4,791,564 | 12/1988 | Takai | 711/112 |
| 5,349,448 | 9/1994 | Hirai | 358/444 |
| 5,530,673 | 6/1996 | Tobita et al. | 365/185.09 |
| 5,548,740 | 8/1996 | Kiyohara | 711/100 |
| 5,584,007 | 12/1996 | Ballard | 711/113 |
| 5,708,650 | 1/1998 | Nakashima et al. | 369/275.3 |

*Primary Examiner*—Edward L. Coles
*Assistant Examiner*—Joseph R. Pokrzywa
*Attorney, Agent, or Firm*—Oblon, Spivak, McClelland, Maier & Neustadt, P.C.

[57] ABSTRACT

An information processing apparatus forms an image on a recording medium by accessing image data stored in a hard disk device in the form of files, while using file-related information about the files in the hard disk device, by accessing a semiconductor memory device that holds the file-related information.

2 Claims, 9 Drawing Sheets

INFORMATION PROCESSING APPARATUS HAVING A REDUCED ACCESS TIME TO STORAGE DEVICES

BACKGROUND OF THE INVENTION

The present invention generally relates to information processing apparatuses such as printers, copiers, computers, and the like. More particularly, the present invention relates to an information processing apparatus that carries out at least one of reading and writing of data to and from a storage device in which the stored data is managed in the form of files.

A printer is a typical information processing apparatus. Conventionally, there is a printer that is equipped with a large capacity storage device such as a hard disk device. The hard disk device in such a printer is used as a memory device of various data, such as font data, form-overlay data, outline font data, and the like, that are downloaded from a host device to which the printer is connected. Further, the hard disk device is used as a spool buffer memory device that temporarily stores print data transmitted from the host device.

In a hard disk device, each of the data stored therein forms a file together with other data also present in the hard disk device, wherein a file is a unit of information that are integrally related to each other. Thus, access to the data in a hard disk device is achieved generally via file-related information which typically includes a file allocation table and directory information, wherein the file allocation table provides information about the location of individual data forming a file. The directory information on the other hand indicates the constitution of the file.

Figure 1:
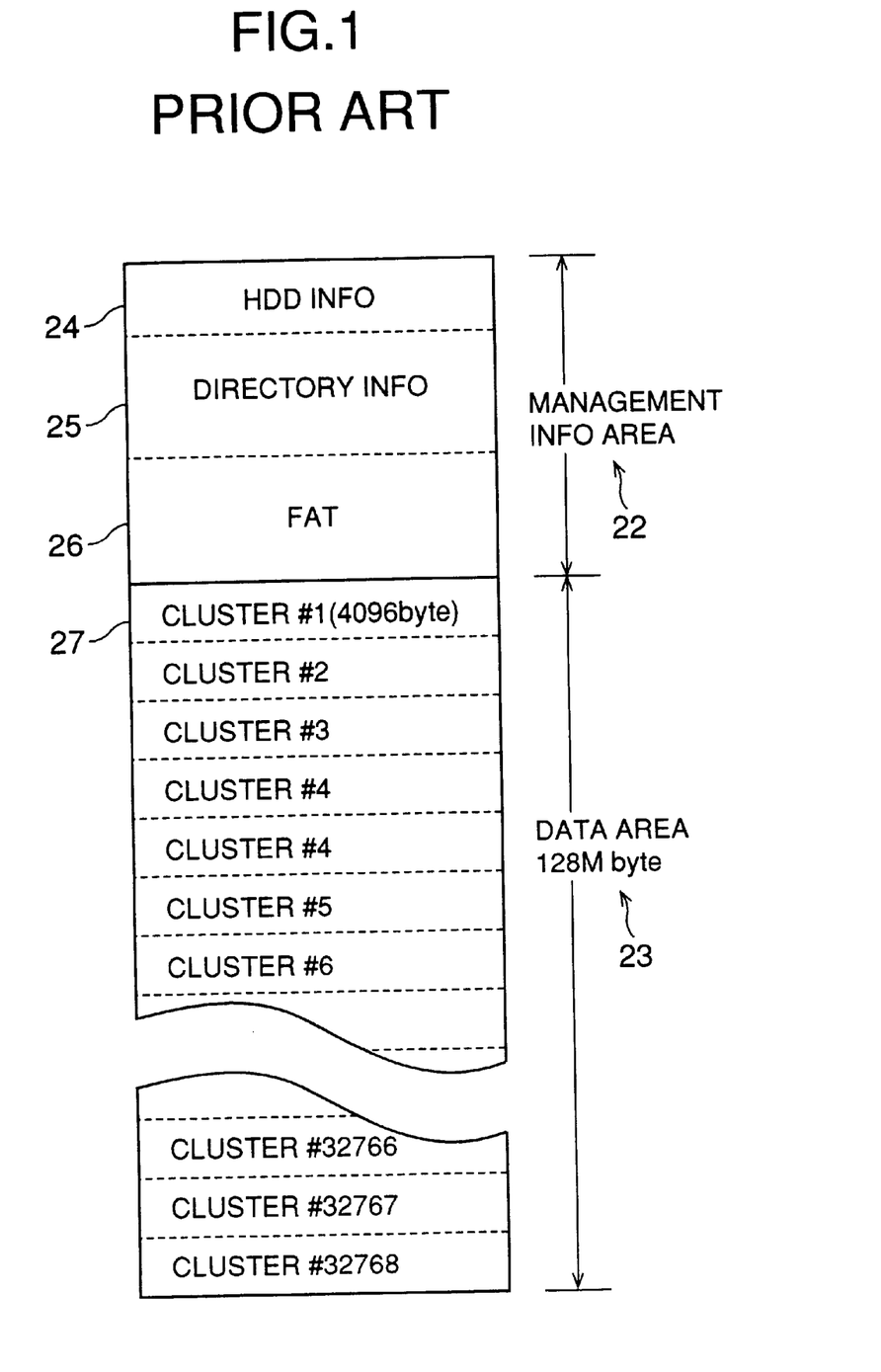
FIG. 1 is a diagram schematically showing the constitution of a storage area of a hard disk device used conventionally in an information processing apparatus.

FIG. 1 shows the construction of a storage region of a conventional hard disk device used for printers.

Referring to FIG. 1, the storage region of the hard disk device is generally divided into a managing information area 22 and a data area 23, wherein the managing information area 22 stores therein hard disk information 24, directory information 25 and a file allocation table 26. Thereby, the directory information 25 and the file allocation table 26 form the file-related information as already noted.

The data area 23, in turn, is divided into a number of clusters 27, and writing as well as reading of data is achieved by using the cluster as a unit of read/write operation. In the case one cluster has a size of 4096 bytes, it should be noted that there exist 32768 clusters in a data area of 128 Mbytes.

The file allocation table 26, on the other hand, is used to indicate which of the clusters are used to store the data that forms a file and is commonly designated as "FAT" or "File Management Table." The directory information 25, in turn, includes information such as a file name, date of creation of the file, size of the file, designation of the first cluster that is used to store the data forming the file, and the like.

Conventionally, the directory information and the file allocation table are stored in a predetermined area on the hard disk device together with files, as indicated in FIG. 1.

Thus, reading of specific data has been made by a CPU of an information processing apparatus, which may be a printer, such that the CPU first accesses the directory information and the file allocation table on the hard disk device for acquiring the information about the location of the clusters of the hard disk region in which the target data is stored. The CPU then reads the target data from the clusters of the hard disk region thus identified.

When writing data, on the other hand, the CPU first accesses the directory information and the file allocation table on the hard disk device in search of unused or vacant hard disk region and then writes the data into the unused hard disk region thus found. Further, the CPU updates the directory information and the file allocation table so as to ensure that the change that has occurred as a result of the storage of the data into the unused hard region of the hard disk device, is properly recorded.

As will be understood from the explanation above, the process of referring to or updating the file-related information, such as the directory information and the file allocation table, occurs inevitably, whenever an access is made to a file in a hard disk drive whether the access may be a reading of data or a writing of data.

However, a hard disk drive, while having various features of large storage capacity, low cost per byte, non-volatile nature of data retention, and the like, which are distinctively advantageous over semiconductor memories such as a DRAM (dynamic random access memory) or an SRAM (static random access memory), has a serious drawback in that the access time is substantially larger than that of a DRAM or an SRAM. More specifically, a typical hard disk device has an average access time of 20 $\mu$sec per byte, while this value is about 100 times as large as the access time of a semiconductor memory device. A typical DRAM has an average access time of 0.2 $\mu$sec per byte.

Thus, in conventional information processing apparatuses such as a printer, there has been a problem that a long time is needed for processing the data stored in a hard disk device in the form of files, due to the long access time of the hard disk device as compared with semiconductor RAMs. As noted above, this problem of the long access time arises due to the operation of referring to or updating the file-related information stored in the hard disk device wherein such an accessing to the file-related information occurs whenever an access is made to a file in the hard disk device for reading or writing.

SUMMARY OF THE INVENTION

Accordingly, it is a general object of the present invention to provide an information processing apparatus wherein the foregoing problems are eliminated.

Another and more specific object of the present invention is to provide an information processing apparatus having a hard disk device as well as a processing of information stored in the hard disk device of the information processing apparatus in the form of files, wherein the time needed for the file processing is reduced substantially.

Another object of the present invention is to provide an information processing apparatus, comprising:

a first storage device storing information in the form of files;

a second storage device having an access time shorter than an access time of said first storage device, said second storage device storing file-related information necessary for accessing a file in said first storage device, for each of said files stored in said first storage device; and a controlling device for controlling said first and second storage devices so as to carry out at least one of reading and writing of data to or from said first storage device in the form of a file.

According to the present invention, the second storage device is accessed first for the file-related information such as the file allocation table or the directory information whenever there occurs a request for accessing a file held in the first storage device. Thereby, the foregoing access to the second storage device for the file-related information is performed in a reduced time due to the reduced access time of the high-speed memory device used for the second storage device. Thus, the overall access time needed for reading data or writing data to or from the first storage device is reduced substantially.

Other objects and further features of the present invention will become apparent from the following detailed description when read in conjunction to the attached drawings.

DETAILED DESCRIPTION OF THE PREFERRED EMBODIMENTS

Figure 2:
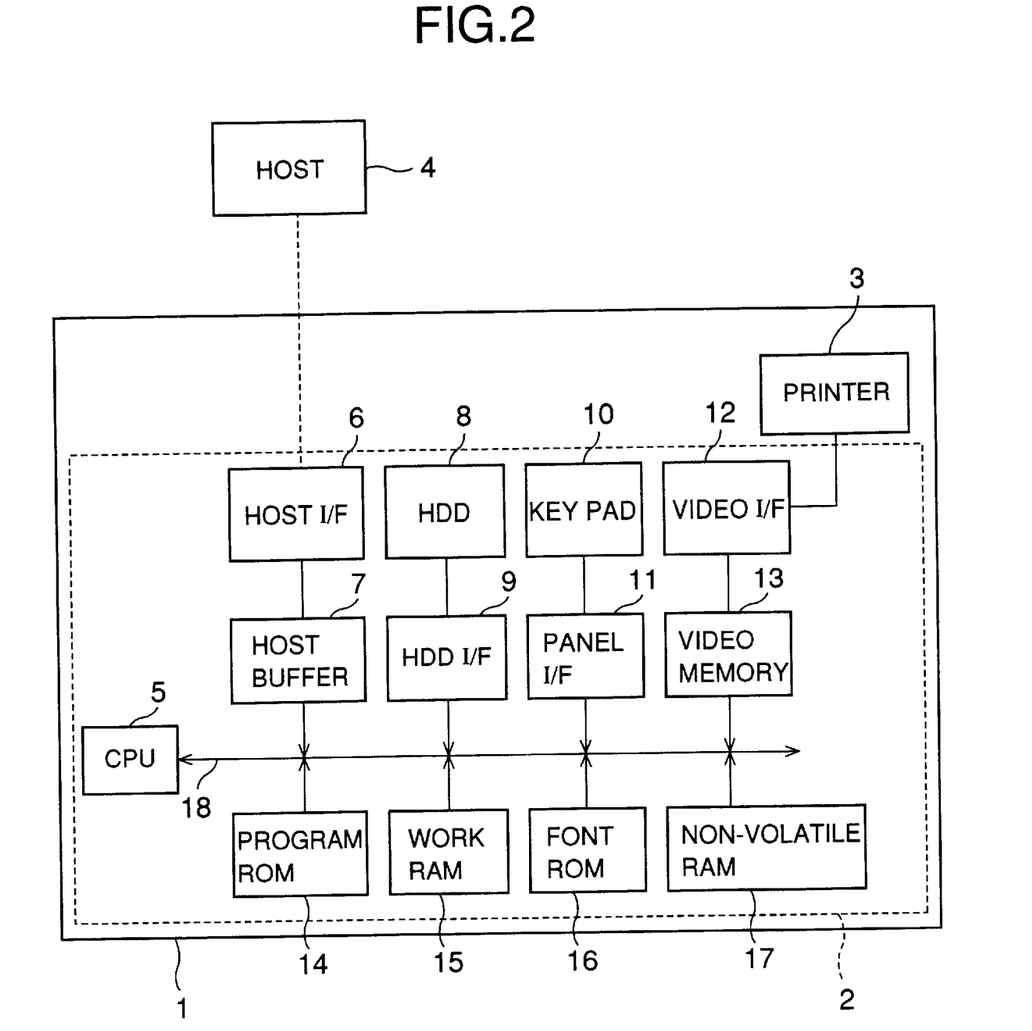
FIG. 2 is a block diagram showing the construction of a laser printer according to a first embodiment of the present invention.

FIG. 2 is a block diagram showing the construction of a laser printer 1 according to a first embodiment of the information processing apparatus of the present invention.

Referring to FIG. 2, the laser printer 1 includes a printer controller 2, a manipulation device 10 and a printer engine 3 connected each other by a system bus 18 and forms a desired image on a recording medium such as a recording sheet based on image data transmitted from a host device 4.

The printer controller 2 includes a CPU 5 acting as a control unit, wherein the CPU 5 controls various processes carried out in the printer controller 2, based upon a program stored in a program ROM 14. The program ROM 14 may further hold an emulation program that is used for analyzing the transmission data from the host device 4 and for converting the same to corresponding image data.

The CPU 5 carries out a predetermined operation based upon the program stored in the program ROM 14 as noted already, wherein the CPU 5 uses a work RAM 15 for this operation. It should be noted that the work RAM 15 is typically formed of a DRAM and provides a work area to the CPU 5 for a temporary storage of information. Further, the work RAM 15 may additionally store various miscellaneous information.

The printer controller 2 of FIG. 2 further includes a font RAM 16 that stores various fonts used for converting the transmission data of the host device 4 to the image data. In addition, the printer controller 2 includes a host interface 6 for carrying out communication to the host device 4. Thus, the transmission data of the host device is received by the printer controller 2 via the host interface 6, wherein the data thus received is stored temporarily in a host buffer device 7, which is a reception buffer memory device.

The manipulation device 10 of the printer 1 includes a keypad, and the data input to the manipulation device 10 is transmitted to the CPU 5 via a panel interface 11. In addition to the keypad, the manipulation device 10 includes a display device (not shown) for displaying the status of the printer 1 as well as switches (not shown) for an operator to provide various instructions to the printer 1.

Further, the printer controller 2 includes a video memory 13 that stores the image data arranged in the form of pages. The video memory 13 is generally formed of a DRAM and supplies the image data of each page to the printer engine 3 via a video interface 12. The printer engine 3, on the other hand, has an ordinary construction and carries out a formation of the images on a recording medium as noted above.

Further, the printer controller 2 includes a hard disk device 8 connected to the system bus 18 via a hard disk interface 9 as a first storage device, wherein the hard disk device 10 is used for storing various data that are downloaded from the host device 4 via the host interface 6, such as the download font data or form-overlay data.

It should be noted that the printer controller 2 further includes a battery-backed up DRAM 17 designated hereinafter simply as RAM 17, as a second storage device, wherein the RAM 17 thus backed up by a battery holds the data stored therein even when the electric power of the printer 1 is turned off. In other words, the RAM 17 acts as a non-volatile memory device. The RAM 17, being formed of a semiconductor memory device, provides a very fast access speed.

The RAM 17 has been used conventionally for storing various information about the printer setting control that are input by the operator via the manipulation device 10, while in the case of the present invention, the RAM 17 is used also for storing file-related information such as the file allocation table and the directory information that are stored in the hard disk device 8. In other words, the RAM 17 stores the file-related information that is used when an access is made to the hard disk device 8.

It should be noted that the program ROM 14 or the font ROM 16, while being a non-volatile memory device similarly to the battery backed up RAM 17, is different from the foregoing RAM 17 in that the ROM 14 and the ROM 16 are read-only memories. The work RAM 15, on the other hand, is a volatile memory that loses the content upon turning-off of the printer 1.

Figure 3:
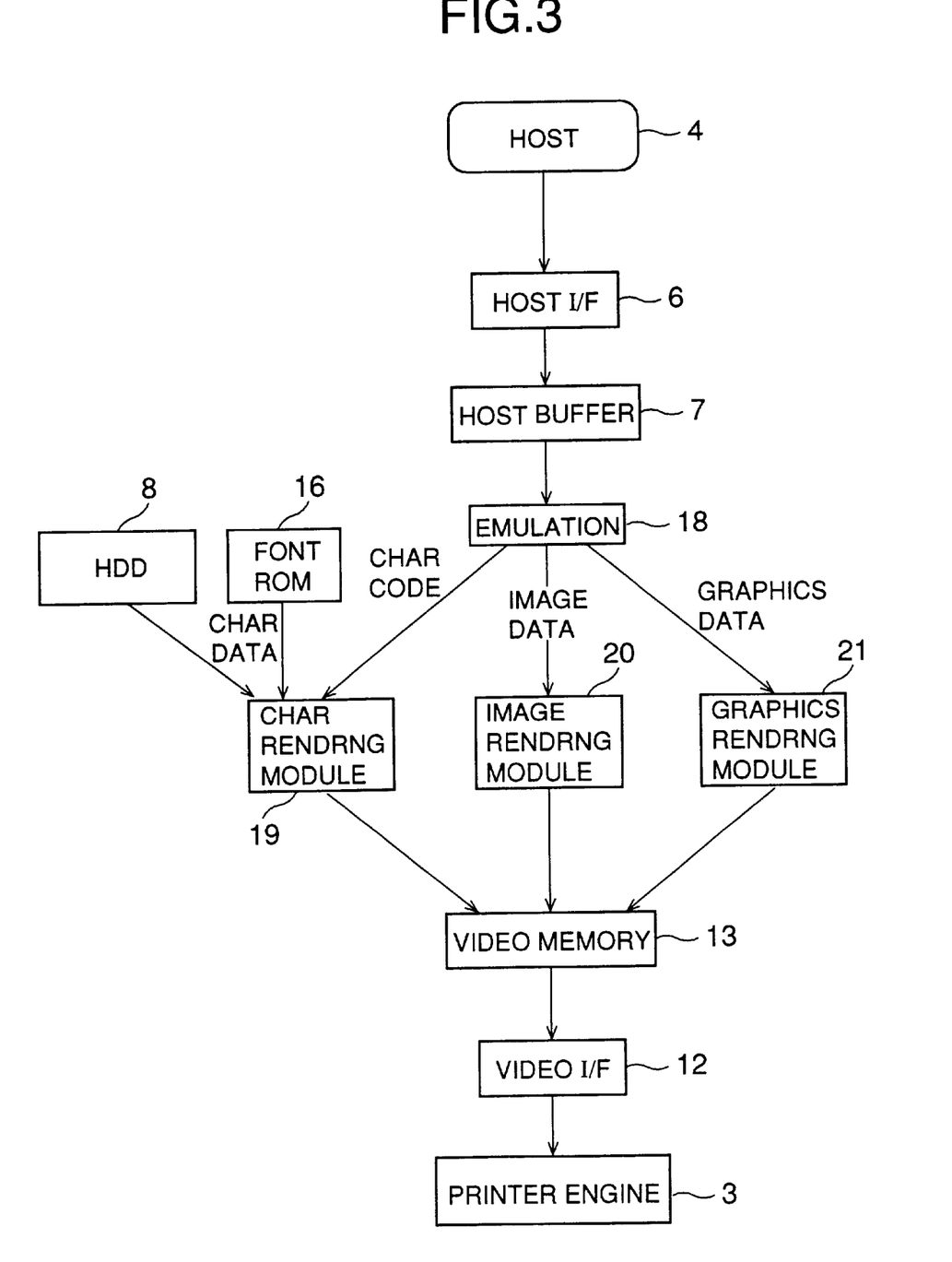
FIG. 3 is a flowchart showing a flow of data in the laser printer of FIG. 2 including the steps of converting transmission data of a host device to image data and recording of the image data by a printer engine.

FIG. 3 shows the process carried out in the printer 1 of FIG. 2 for converting the transmission data of the host device 4 to corresponding image data and for forming an image by the printer engine 3 in response to the image data thus converted.

Referring to FIG. 3, the transmission data of the host device 4 is supplied to the host interface 6 of the printer controller 2 as noted already, wherein the host interface 6, upon reception of the transmission data from the host device 4, notifies the CPU 5 of the reception of transmission data by issuing a CPU interrupt request. The CPU 5, in turn, reads out the transmitted data thus received by the host interface 6 and stores the data in the host buffer 7 temporarily. Thereby, the transmission data thus stored in the host buffer 7 is read out consecutively and analyzed by the CPU 5 under control of the emulation program 18 stored in the program ROM 14.

In the present embodiment, the program ROM 14 stores therein a plurality of emulation programs in order to attend to various command systems used in the host device 4. This, in turn, means that the printer 1 of the present invention can be connected to a plurality of host devices. The appropriate selection of the emulation program in adaptation to the connected host device may be achieved by transmitting a predetermined command from the host device 4 to the printer 1. Alternatively, a suitable command may be input manually through the manipulation device 10.

The transmission data of the host device 4 includes various codes, data and instructions, such as character codes used for specifying characters, image data of an image to be recorded, graphics commands used for forming a graphic image, control commands used for specifying the location of the image on the recording medium, download commands used for downloading font data and form-overlay data, query commands used for urging the printer 1 to provide information about the printer such as the constitution of the printer or the state of the printer, and the like.

As noted already, the CPU 5 operates in accordance with the emulation program and analyzes the foregoing transmission data for discrimination of the foregoing various codes, data and instructions. Thereafter, the CPU 5 forms image data on the video memory 13 in the form of pages, under control of a rendering program called a rendering module.

The rendering module is formed of a character rendering module 19 used for rendering character codes, image rendering module 20 used for rendering image data, and a graphic rendering module 21 used for rendering graphics data, wherein the character rendering is achieved by using the font data stored in the font ROM 16 or in the hard disk device 8.

After the rendering for one page of image data is completed by the rendering modules 19, 20 and 21 and the image data thus obtained is held in the video memory 13, the image data is forwarded to the printer engine 3 via the video interface 12, wherein the printer engine 3 carries out the formation of the image on a recording medium based upon the foregoing image data.

Figure 4:
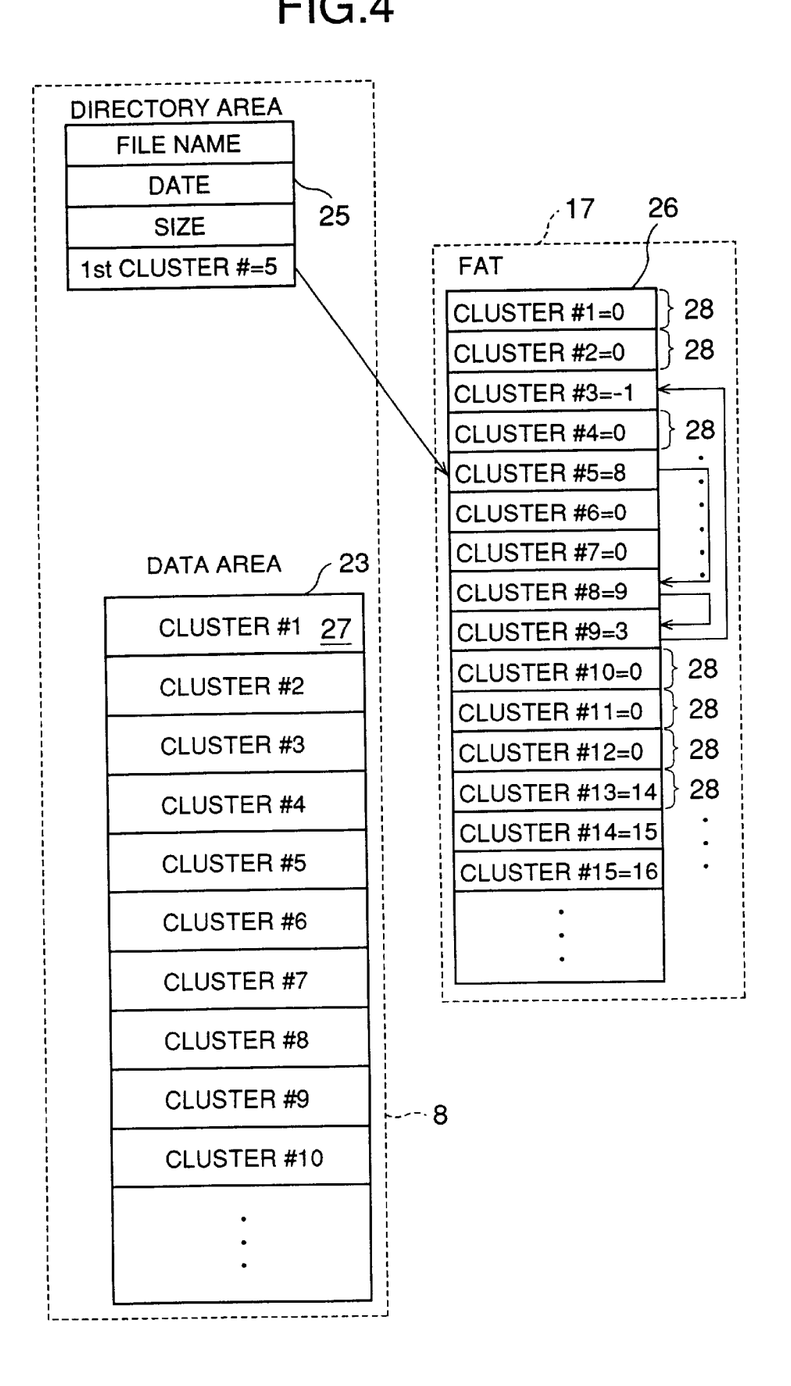
FIG. 4 is a diagram schematically representing the procedure of accessing data stored in a hard disk device in the form of a file, together with a schematic illustration of the structure of a file allocation table.

FIG. 4 schematically shows the procedure for accessing the data stored in the hard disk device 8 as a file, together with the constitution of the directory information and the file allocation table.

Referring to FIG. 4, the hard disk device 8 has a data area 23 divided into clusters 27 as usual, wherein a search of a target file is made in the process of FIG. 4 by accessing the directory information held in a directory area 25 of the hard disk device 8. It should be noted that the directory area 25 is the area that stores "directory information" which is one of the file-related information of the files stored in the hard disk device 8. As usual, the directory information includes information such as the file name, creation date of the file, size of the file, identification of the first cluster that holds the data that belongs to the file.

The data forming a file is stored on the hard disk device in the form of a number of clusters, and the file allocation table indicates which of the clusters are used for the data that forms the file.

In the example of FIG. 4, the CPU recognizes, by accessing to the directory information in the area 25, that the first cluster used to store the data constituting the target file has a cluster designation of "FIRST CLUSTER=5."

In correspondence to this, the file allocation table 26 holds information, in a corresponding block 28, about the designation of the cluster that immediately follows the first cluster #5. In the example of FIG. 4, it will be noted that the cluster #5 includes the designation of "CLUSTER#5=8," indicating that the cluster that immediately follows the cluster #5 is the cluster #8.

Similarly, the file allocation table 26 holds information about the designation of the cluster that immediately follows the second cluster #8 by designating that "CLUSTER#8=9," indicating that the cluster that immediately follows the cluster #8 is the cluster #9. Further, the file allocation table 26 holds information about the designation of the cluster that immediately follows the third cluster #9 by designating that "CLUSTER#9=3," indicating that the cluster that immediately follows the cluster #9 is the cluster #3. Further, the file allocation table 26 holds the designation "CLUSTER#3=−1," indicating that there is no cluster after the cluster #3.

Thus, as indicated in FIG. 4, the data forming a file are identified by the designation of the first cluster in the directory information 25 and the link of the clusters in the file allocation table 26. In the file allocation table 26 of FIG. 4, the designation "0" used in some of the clusters such as the cluster #1 (CLUSTER#1=0) indicates that the cluster is unused and no data exists therein.

In FIG. 4, it should be noted that each block 28 of the file allocation table 26 stores the designation of two clusters in the maximum, one for the cluster pertinent to the block and the other for the cluster that follows the cluster of the block. Thus, when there are 32768 clusters in the hard disk device 8 and the designation of the cluster is made by one-byte format data, a single block 28 of the file allocation table 26 requires a size of 2 bytes. This means that the overall size of the file allocation table 26 may become 65536 bytes or 64 kbytes in the maximum.

Figure 5:
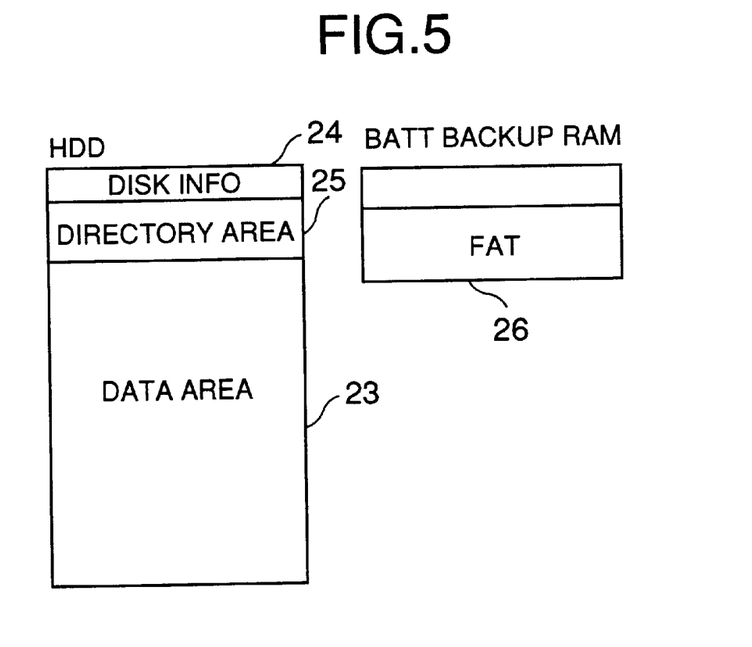
FIG. 5 is a diagram showing a first example of the contents of the hard disk device and a non-volatile RAM cooperating therewith according to the first embodiment of the present invention.

FIG. 5 represents a first example of the constitution of the storage device according to a first embodiment of the present invention, wherein the hard disk device 8 and the non-volatile RAM 17 forms the storage device of the printer 1, see the block diagram of FIG. 2.

Referring to FIG. 5, the hard disk device 8 includes an area 24 for the hard disk information in addition to the directory area 25 and the data area 23 described previously, while the non-volatile RAM 17 holds the information that includes the file allocation table 26.

In the example of FIG. 5, the CPU 5 of the printer controller 2 makes an access to the directory area 25 of the hard disk device 8 at first, when an image formation is to be made according to a predetermined procedure, in search of the first cluster used to store the data forming the target file. After the designation of the first cluster is acquired, the CPU 5 makes an access to the non-volatile RAM 17 for the file allocation table 26 held therein.

As the RAM 17, formed of a semiconductor memory device such as a DRAM, has an access speed much larger than that of a hard disk device, the construction of FIG. 5 provides a very fast access to the file allocation table 26 as compared with the conventional hard disk devices in which the file allocation table 26 is held only in the hard disk device. Thereby, the time needed for reading or forming the desired image by the printer 1 is reduced substantially.

Figure 6:
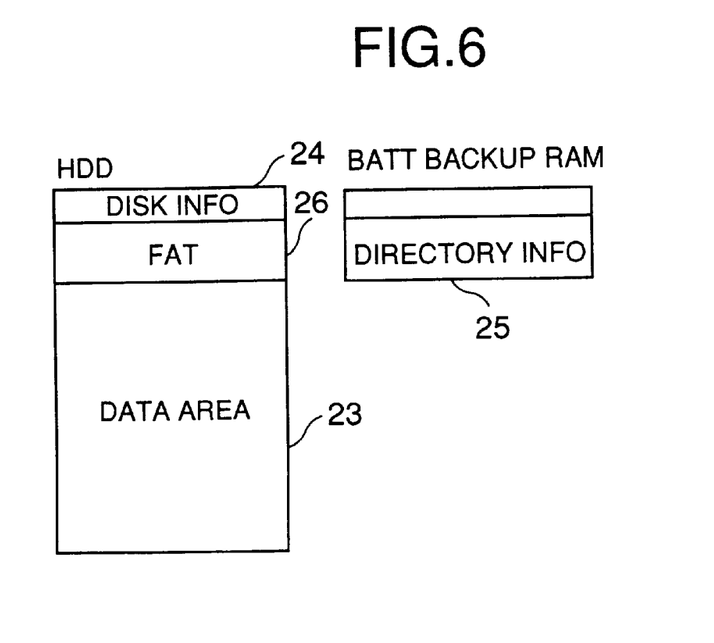
FIG. 6 is a diagram showing a second example of the contents of the hard disk device and the non-volatile RAM according to the first embodiment of the present invention.

FIG. 6 shows a second example of the constitution of the hard disk device 8 and the non-volatile RAM 17 according to the first embodiment of the present invention.

Referring to FIG. 5, the hard disk device 8 now stores the disk information 24, the file allocation table 26 and the data 23, while the non-volatile RAM 17 is used to store the directory information 25.

In the second embodiment, the formation of an image is made such that the CPU 5 first accesses the directory information 25 stored in the non-volatile RAM 17 in search of the first cluster used for storing the data that forms the target file. After the designation of the first cluster is thus acquired, the CPU 5 accesses the file allocation table 26 in the hard disk device 8 for the clusters forming the file. By using the non-volatile RAM 17 as such, it is possible to reduce the processing time of the printer 1 as compared with conventional printers in which the directory information 25 and the file allocation table 26 are held only in the hard disk device 8.

Figure 7:
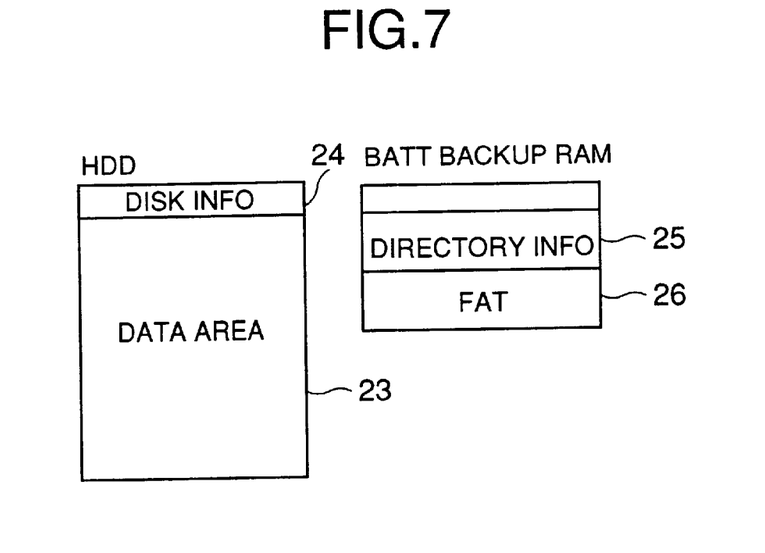
FIG. 7 is a diagram showing a third example of the contents of the hard disk device and the non-volatile RAM according to the first embodiment of the present invention.

FIG. 7 shows a third example of the constitution of the hard disk device 8 and the non-volatile RAM 17 according to the first embodiment of the present invention.

Referring to FIG. 7, it will be noted that the non-volatile RAM 17 has a storage capacity large enough to hold both the file allocation table 26 and the directory information 25. In such a case, therefore, the access time for the hard disk device 8 is reduced dramatically in terms of the access time for accessing both the file allocation table 26 and the directory information 25.

Figure 8:
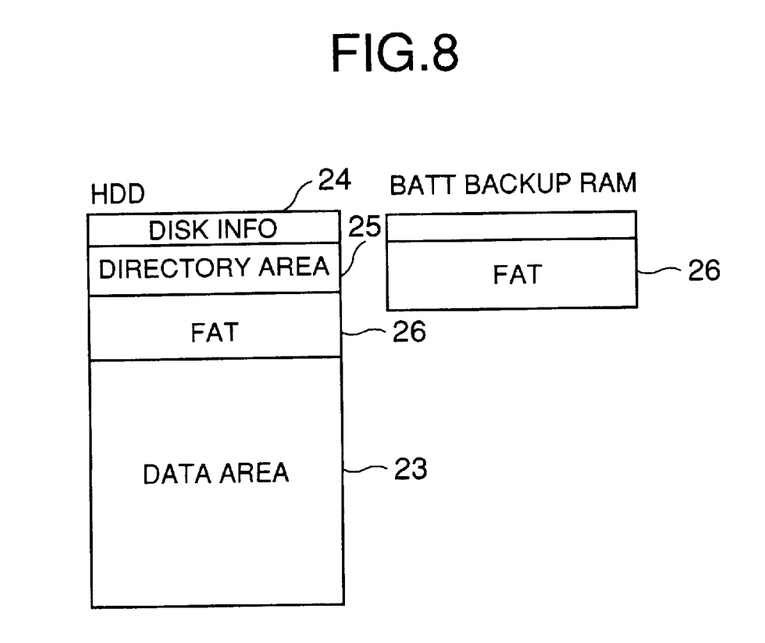
FIG. 8 is a diagram showing the contents of the hard disk device and the non-volatile RAM according to a second embodiment of the present invention.

Next, a second embodiment of the present invention will be described with reference to FIG. 8, wherein the present embodiment provides a detachable mounting of the hard disk device 8 on the printer 1.

In such a configuration of the printer 1 that allows a removal of the hard disk device 8 from the printer, the file-related information such as the directory information 25 and the file allocation table 26 are not only stored in the non-volatile memory 17 but also in the hard disk device 8. In the example of FIG. 8, the file allocation table 26 held in the non-volatile RAM 17 is stored also in the hard disk device 8.

When carrying out a formation of an image in the printer 1 of the present embodiment, the CPU 5 first makes an access to the directory area 25 of the hard disk device 8 in search of the first cluster used to store the data forming the target file, similarly to the first embodiment. After the designation of the first cluster is thus acquired, the CPU 5 makes an access to the non-volatile RAM 17 for the file allocation table 26 stored therein. Thereby, the access time of the hard disk device is reduced as compared with the conventional printer in which all the file-related information are held in the hard disk device 8, similarly to the case of the previous embodiment.

On the other hand, the printer 1 of the present embodiment further stores the file allocation table 26 not only in the non-volatile RAM 17 but also in the hard disk device 8 as already noted, wherein it should be noted that such a construction enables the hard disk device 8 to be used in a second, different printer that allows the use of a removable hard disk device. In such a case, the second printer carries out the processing of the file in the hard disk device 8, by referring to the directory information 25 and the file allocation table 26 held in the hard disk device 8 just similarly to a conventional printer.

Thereby, in order to maintain the coherency between the file-related information in the non-volatile RAM 17 and the file-related information in the hard disk device 8, it is necessary to update the contents of the file allocation table 26 in the hard disk device 8 whenever the hard disk device 8 is removed from the printer 1 in accordance with the contents of the file allocation table 26 in the non-volatile RAM 17. It should be noted that the file allocation table 26 in the non-volatile RAM 17 may be updated upon the accessing to the files in the hard disk device 8 and may no longer agree to the file allocation table 26 held in the hard disk device 8. When such outdated file allocation table is used, no proper management of the hard disk device 8 is possible.

It should be noted that the foregoing updating of the file allocation table 26 is necessary only when erasing or writing is made into the hard disk device 8. No modification is made in a reading mode of the hard disk device 8, as the file allocation table 26 is used only as a reference in the read mode operation. Thus, the foregoing problem of discrepancy in the file allocation tables occurs only when the hard disk device 8 is accessed for writing or deletion of data.

Hereinafter, the process for updating of the file allocation table 26 in the hard disk device 8 will be described with reference to the flowcharts of FIGS. 9A and 9B.

Figure 9A:
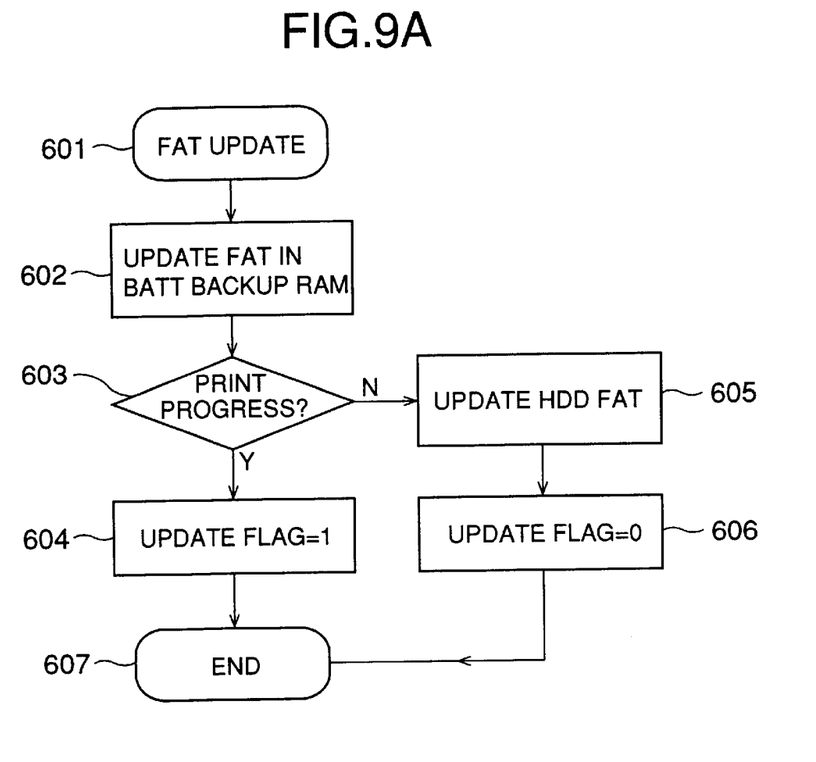
FIGS. 9A and 9B are flowcharts showing a first updating procedure of file-related information according to the second embodiment of the present invention.

Referring to FIG. 9A, the process starts with a step 601 in response to the occurrence of a request for updating the file allocation table 26 in the non-volatile RAM 17. Thus, the content of the file allocation table 17 in the RAM 17 is updated in a step 602, and the status of the printer 1 is examined in a step 603 whether or not the image data is held in the video memory device 13 or in the host buffer memory device 7 of the printer 1 for image recording.

When it is confirmed that the formation of the image is in progress either in the buffer memory device 7 or in the video memory device 13, a table update flag "1" is set in a step 604 indicating that the printer 1 is in the process of formation of an image. The flag "1" is thereby stored in a suitable location of the file allocation table 26 in the non-volatile RAM 17 or in a suitable register provided in the CPU 5, and the process proceeds to an end process in a step 607 without updating the file allocation table 26 in the hard disk device 8.

When the printer 1 is in an idling state in the discrimination step 603 and no image formation is in progress, the process proceeds to a step 605 and the content of the file allocation table 26 in the hard disk device 8 is updated in accordance with the content of the file allocation table 26 in the non-volatile RAM 17. Further, a flag "0" indicating that the allocation table 26 of the hard disk device 8 is updated, is set in a subsequent step 606. Similarly to the flag "1," the flag "0" is set in a suitable location of the file allocation table 26 of the non-volatile RAM 17 or in a suitable register in the CPU 5. After the step 606, the process proceeds to an end step 607.

In the state where the step 606 is reached, it should be noted that the printer 1 has either the flag "0" of flag "1," wherein the flag "1" indicates that the updating of the file allocation table 26 in the hard disk device 8 is not complete.

Figure 9B:
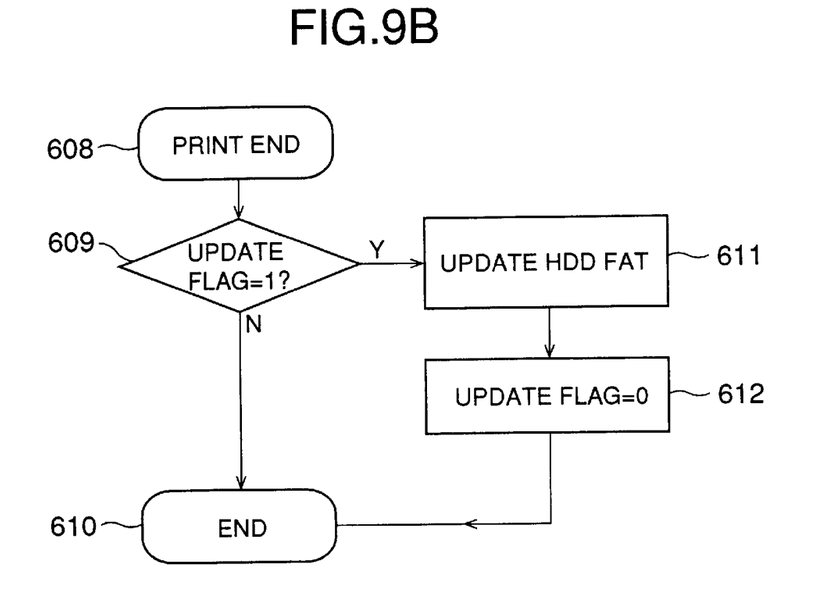

Thus, when the process of forming the image is completed in the printer 1 in a step 608 as indicated in FIG. 9B, a step 609 is carried out to check about the status of the flag whether the value of the flag is "0" or "1." When the value of the flag is "0," the updating of the file allocation table 26 in the hard disk device 8 is already completed and the process proceeds straight to an end step 610. On the other hand, when the value of the flag is "1," a step 611 is carried out and the content of the file allocation table 26 in the hard disk device 8 is updated. Further, the flag "1" is reset to "0" in the following step 612, and the process reaches the end step 610.

The foregoing processes of FIGS. 9A and 9B are carried out by the CPU 5 under the control of an updating program stored in the program ROM 14.

Figure 10:
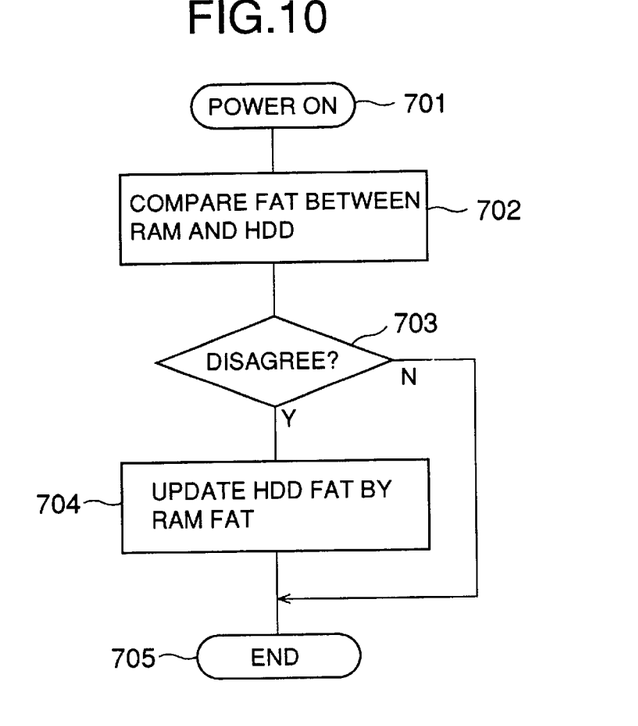
FIG. 10 is a flowchart showing a second updating procedure according to the second embodiment.

FIG. 10 shows a flowchart of updating the file allocation table in the hard disk device 8 in conformity with the file allocation table 26 of the non-volatile RAM 17, according to a modification of the second embodiment.

Referring to FIG. 10, the updating procedure of the file allocation table 26 is activated in response to an initialization step 701 of the printer which is carried out each time the electric power of the printer is turned on. Thus, the updating procedure includes a step 702 for comparing the content of the file allocation table 26 in the non-volatile RAM 17 and the content of the file allocation table 26 in the hard disk 8, wherein a discrimination is made in a step 703 based upon the result of comparison in the step 702 whether the content of the file allocation table 26 of the RAM 17 agrees to the content of the file allocation table 26 of the hard disk device 8.

If the result of discrimination in the step 703 indicates no discrepancy, the process proceeds immediately to a step 705 and the updating procedure is terminated without causing the updating of the file allocation table 26 in the hard disk device 8. On the other hand, if the step 703 has detected a discrepancy, the file allocation table 26 of the hard disk device 8 is updated by the file allocation table 26 of the non-volatile RAM 17 in a step 704. After the step 704, the process proceeds to the step 705. It should be noted that the foregoing process is carried out by the CPU 5 under control of an updating program held in the program ROM 14.

According to the present embodiment, it is possible to positively update the file allocation table 26 of the hard disk device 8 in conformity with the file allocation table 26 of the non-volatile RAM 17, by turning the printer 1 on, even when the file allocation table in the hard disk device 8 is damaged or even when the printer 1 is turned off previously before the file allocation table 26 of the hard disk device 8 is updated.

In the present embodiment, it should be noted that the procedure of FIG. 10 can be combined with the procedure of FIG. 9A or 9B. Thereby, the updating of the file allocation table is carried out according to the procedure of FIG. 9A or 9B when the printer is already turned on, while the procedure of FIG. 10 is used when restarting the printer after turning off the electric power.

Figure 11A:
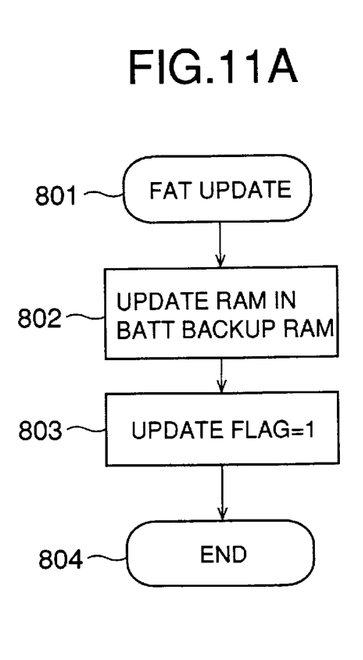
FIGS. 11A and 11B are flowcharts showing a third updating procedure according to the second embodiment of the present invention.
Figure 11B:
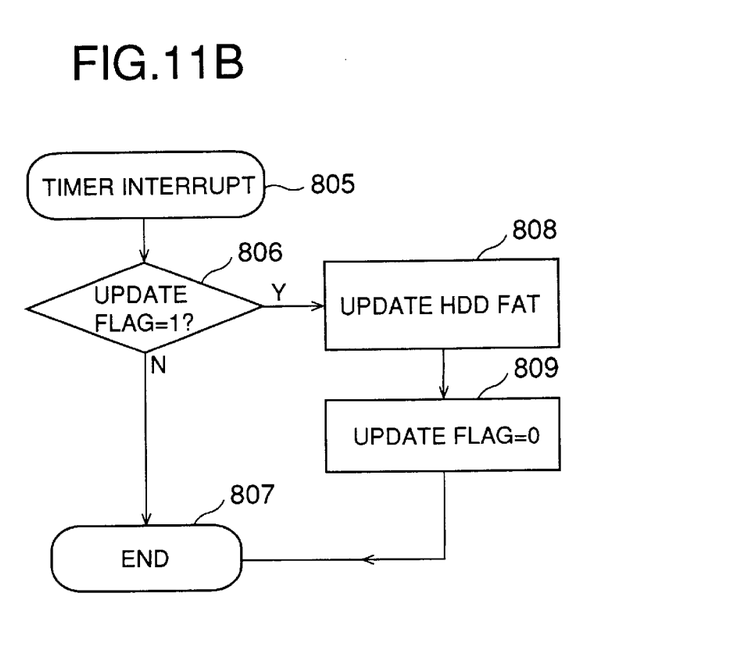

FIGS. 11A and 11B show a further modification of the second embodiment for updating the file allocation table 26 in the hard disk device 8 such that the content of the file allocation table 26 in the hard disk device 8 agrees to the content of the file allocation table 26 of the non-volatile RAM 17, wherein such an updating procedure is carried out periodically in the embodiment of FIGS. 11A and 11B.

Referring to FIG. 11A, when there occurs a need in a step 801 for modifying the content of the file allocation table in response to an access to the file in the hard disk device 8 for writing or erasing, the content of the file allocation table 26 in the non-volatile RAM 17 is updated in a step 802, and a table update flag is set to "1" in a subsequent step 803 for indicating that the content of the file allocation table 26 of the non-volatile RAM 17 is updated. After the step 803, the process proceeds to a step 804 for terminating the process.

Further, in response to each occurrence of a periodical timer interrupt as indicated in a step 805, the CPU 5 checks in a step 806 whether or not the content of the table update flag is "1," and the process is terminated immediately in a step 807 when the content of the flag is "0." When the flag is "1," on the other hand, the CPU 5 updates, in a step 808, the content of the file allocation table 26 in the hard disk device 8 in conformity with the content of the file allocation table 26 of the non-volatile RAM 17. After this, the CPU resets the table update flag to "0" in the step 809, and the process is terminated by proceeding to the end step 807.

In the second embodiment described heretofore, it is assumed that it is the file allocation table 26 that is stored both in the hard disk device 8 and in the non-volatile RAM 17. However, the present embodiment can also be modified such the directory information 25 is stored in the hard disk device 8 and in the non-volatile RAM 17. Further, if the storage capacity of the non-volatile RAM 17 allows, one may store the directory information 25 and the file allocation table 26 both in the hard disk device 8 and in the non-volatile RAM 17.

Next, a third embodiment of the present invention will be described with reference to FIG. 12, wherein it should be noted that the present embodiment has a common feature with the second embodiment in that the file-related information is stored both in a first storage device corresponding to the hard disk device 8 and in a second storage device, except that the volatile work RAM 15 is used for the second storage device in place of the non-volatile RAM 17.

The present embodiment is further different from the second embodiment of the present invention in that the file-related information stored in the hard disk device 8 is copied to the work RAM 15, rather than creating the file-related information in the second storage device and storing the same in the first storage device for compatibility.

Figure 12:
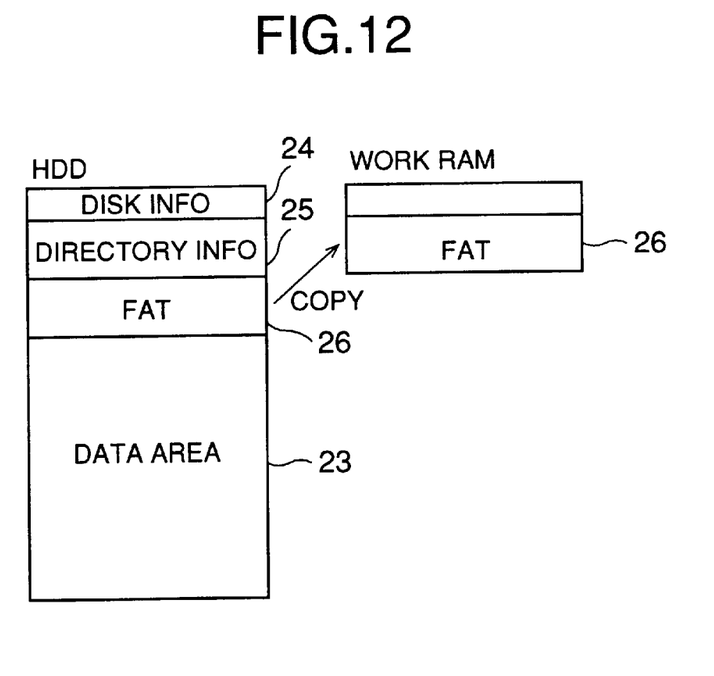
FIG. 12 is a diagram showing the contents of the hard disk device and the non-volatile RAM according to a third embodiment of the present invention.

FIG. 12 shows the construction of the hard disk device 8 and the work RAM 15 cooperating therewith according to a first example of the present embodiment.

Referring to FIG. 12, the construction of FIG. 12 copies the file allocation table in the hard disk device 8 to the volatile work RAM 15 each time the printer 1 is thrown with a power. Thus, the file allocation table 26 in the hard disk device 8 and the file allocation table 26 in the work RAM 15 are identical in the initial state of the printer 1.

As long as the access to the data in the hard disk device 8 is limited to reading, no modification is made to the file allocation table 26 in any of the file allocation table in the hard disk device 8 or the file allocation table in the work RAM 15. Thus, the present embodiment accelerates the speed of reading of the data, by referring to the file allocation table 26 held in the high-speed work RAM 15 alone, when reading data from the hard disk device 8.

When writing or erasing of data is made to the hard disk device 8, on the other hand, there arises a need to update the content of the file allocation table 26. As the work RAM 15 used for storing the file allocation table 26 is a volatile memory, the file allocation table 26 in the work RAM 15 is lost when the electric power of the printer 1 is turned off. Thereby, the status of the files in the hard disk device 8 becomes unknown when the printer 1 is turned on again, and the accessing to the files in the hard disk device 8 becomes no longer possible.

Thus, in order to avoid this problem, the present embodiment updates the content of the file allocation table 26 in the hard disk device 8 similarly to the file allocation table 26 in the work RAM 15 whenever there occurs a need to update the file allocation table 26 in the work RAM 15. Thereby, the file allocation table 26 in the hard disk device 8 is copied to the work RAM 15 each time the printer 1 is turned on or initialized.

Figure 13:
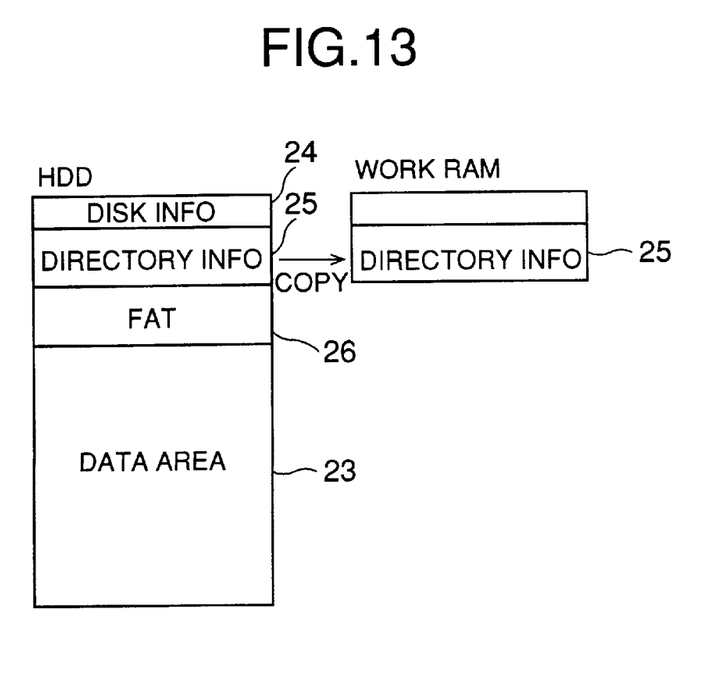
FIG. 13 is a diagram showing the contents of the hard disk device and the non-volatile RAM according to a modification of the third embodiment of the present invention.

FIG. 13 shows a second example of the constitution of the hard disk device 8 and the work RAM 15 according to the third embodiment, wherein it should be noted that the construction of FIG. 13 is different from that of FIG. 12 in the point that the directory information is copied to the work RAM 15 in place of the file allocation table as the file-related information.

More specifically, the construction of FIG. 13 copies the directory information 25 in the hard disk device 8 to the volatile work RAM 15 each time the printer 1 is initialized as in the case of turning-on of the printer. Thereby, the directory information 25 in the hard disk device 8 and the directory information 25 in the work RAM 15 become identical. As the directory information 25 is used only for the purpose of reference in the reading operation of data from the hard disk device 8, no modification occurs in the directory information 25 as long as reading of data is made from the hard disk device 8. Thus, the access time at the time of reading of the hard disk device 8 can be maximized by using the high-speed work RAM 15 as the source of the directory information 25.

When writing or erasing of data is made to the hard disk device 8, on the other hand, there arises a need to update the content of the directory information 25. As the work RAM 15 used for storing the directory information 25 is a volatile memory as noted already, the directory information 25 in the work RAM 15 is lost when the electric power of the printer 1 is turned off. Thereby, the status of the files in the hard disk device 8 becomes unknown when the printer 1 is turned on again, and the accessing to the files in the hard disk device 8 becomes no longer possible.

Thus, in order to avoid this problem, the present embodiment updates the content of the directory information 25 in the hard disk device 8 similarly to the directory information 25 in the work RAM 15 whenever there occurs a request to update the directory information 25 in the work RAM 15. Thereby, the directory information 25 in the hard disk device 8 is copied to the work RAM 15 each time the printer 1 is turned on or initialized.

As described heretofore, the present embodiment maximizes the access speed of the hard disk device 8 by copying the file-related information such as the directory information 25 or the file allocation table 26 in the hard disk device 8 to the high-speed work RAM 15, such that the file-related information in the high-speed work RAM 15 is used when an access is made to the hard disk device 8.

In the case of printers, in particular, it should be noted that the duration for reading file data from a hard disk device is overwhelmingly longer than the duration for writing or erasing file data in the hard disk device. In other words, the frequency of updating of the file-related information in a hard disk device is relatively small in the case of printers used for image formation. Thus, the foregoing construction of the present embodiment is particularly advantageous for the image formation processing carried out based upon file data held in the a hard disk device.

Similarly to the previous embodiments, the present embodiment can be implemented such that both the directory information 25 and the file allocation table 26 are copied from the hard disk device 8 to the work RAM 15 in the case that the work RAM 15 has a sufficient storage capacity. In such a case, a further reduction of the processing time becomes possible.

Further, the present invention is not limited to the embodiments described heretofore, but various variations and modifications may be made without departing from the scope of the present invention.

What is claimed is:

1. An information processing apparatus, comprising:
   a first storage device detachably mounted to said information processing apparatus and storing information in the form of files;
   a second storage device having an access time shorter than an access time of said first storage device, said second storage device storing file-related information necessary for accessing each of said files stored in said first storage device;
   a controlling unit for controlling said first and said second storage devices so as to carry out a processing including accessing said file-related information stored in said second storage device and at least one of reading and writing of file data to or from said first storage device; and
   wherein said controlling unit is configured to also control storage of information identical to said file-related information in said second storage device into said first storage device in an interval in which there is no access to said file-related information stored in said second storage and to carry out an updating of said file-related information with respect to only said second storage unit during said processing, and wherein said controlling unit updates said file-related information stored in said first storage device in conformity with said file-related information stored in said second storage device when said information processing apparatus is initialized.

2. An information processing apparatus as claimed in claim 1, wherein said controlling unit compares said file-related information stored in said first storage device and said file-related information stored in said second storage device, and wherein said controlling unit updates said file-related information stored in said first storage device only when a discrepancy is detected between said file-related information stored in said first storage device and said file-related information stored in said second storage device at the time of initialization of said information processing apparatus.

* * * * *